Jan. 11, 1927.  J. B. PEEBLES ET AL  1,614,386

LAWN MOWER

Filed Nov. 12, 1924  2 Sheets-Sheet 1

Joseph B. Peebles,
Charles M. Stewart,
INVENTOR

BY Victor J. Evans,
ATTORNEY

WITNESS:

Jan. 11, 1927. 1,614,386
J. B. PEEBLES ET AL
LAWN MOWER
Filed Nov. 12, 1924 2 Sheets-Sheet 2

Joseph B. Peebles,
Charles M. Stewart,
INVENTOR

BY Victor J. Evans,
ATTORNEY

WITNESS:

Patented Jan. 11, 1927.

1,614,386

UNITED STATES PATENT OFFICE

JOSEPH B. PEEBLES AND CHARLES M. STEWART, OF PORTSMOUTH, OHIO; SAID STEWART ASSIGNOR TO SAID PEEBLES.

LAWN MOWER.

Application filed November 12, 1924. Serial No. 749,511.

This invention relates to improvements in lawn mowers and has for an object the provision of a motor operated mower which is of light and durable construction and capable of being handled with a minimum amount of effort for the purpose of cutting grass or other vegetation of any height.

For this purpose, the invention aims to provide a motor driven mower of the sickle bar type which will cut with a horizontal reciprocatory action instead of a rotary action as in the usual type of hand mowers.

Another object of the invention is the provision of a lawn mower which includes suction means for gathering the cut grass and for directing the cut grass into a bag or suitable container.

A further object of the invention is the provision of a lawn mower in which a motor is utilized for operating both the cutter and the suction means.

With the above and other objects in view, the invention further includes the following novel features and details of construction, to be hereinafter more fully described, illustrated in the accompanying drawings and pointed out in the appended claims.

In the drawings:—

Figure 1:
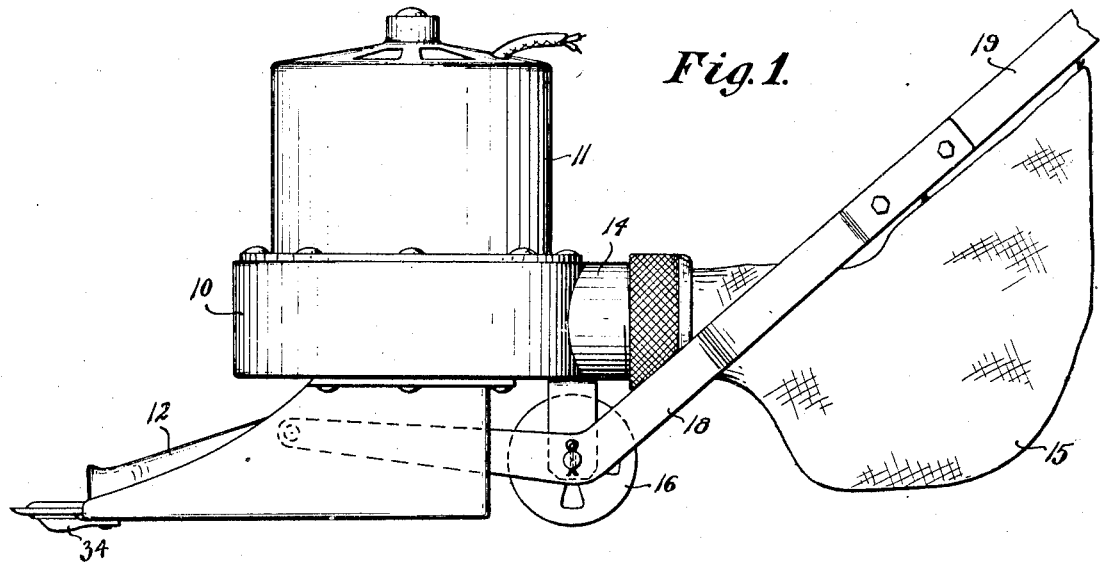
Figure 1 is a side elevation of a mower constructed in accordance with the invention.
Figure 2:
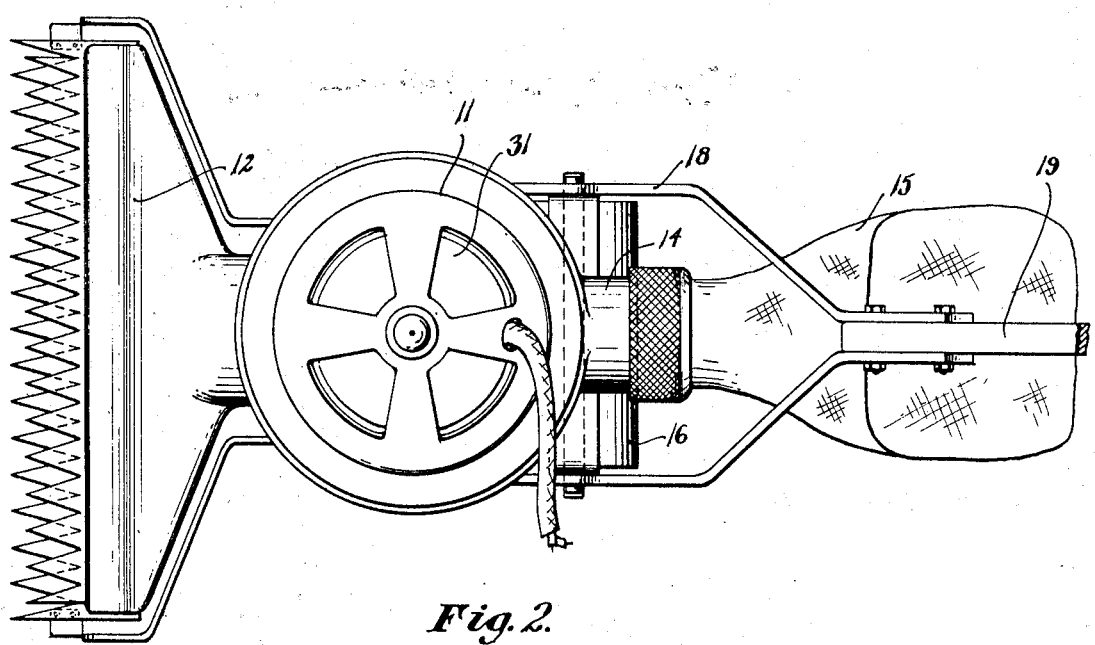
Figure 2 is a top view of the same.
Figure 3:
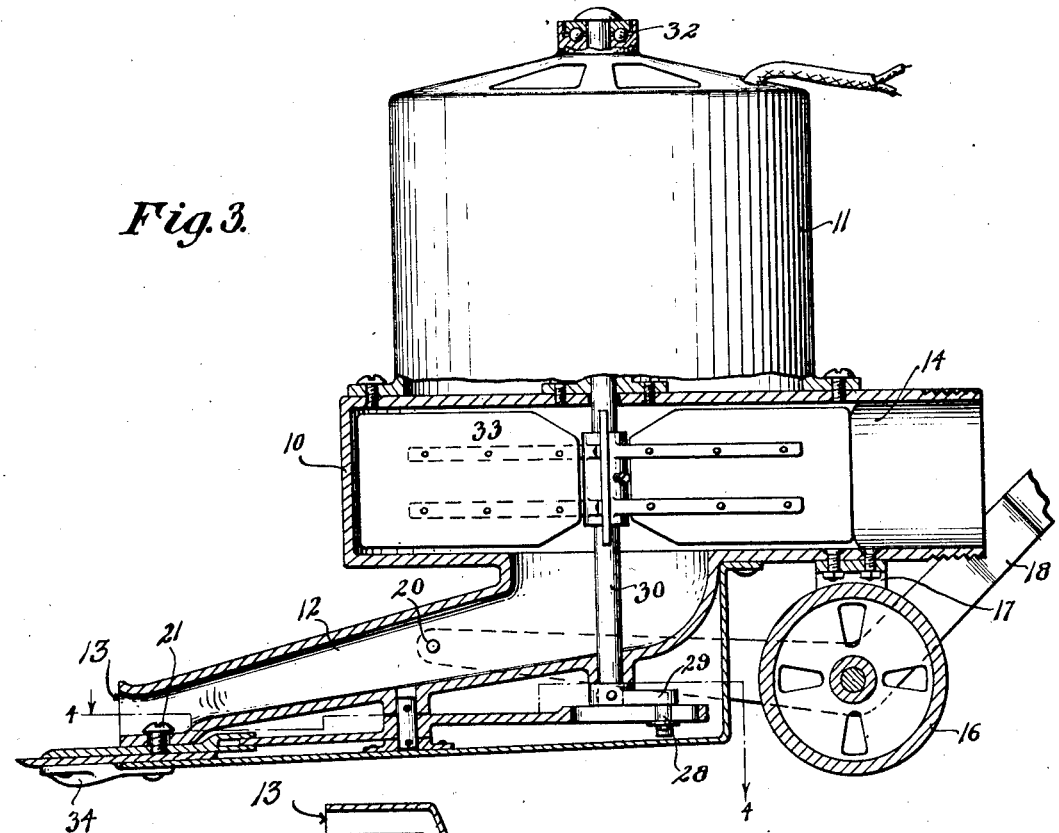
Figure 3 is a central vertical section with the motor housing in elevation.
Figure 4:
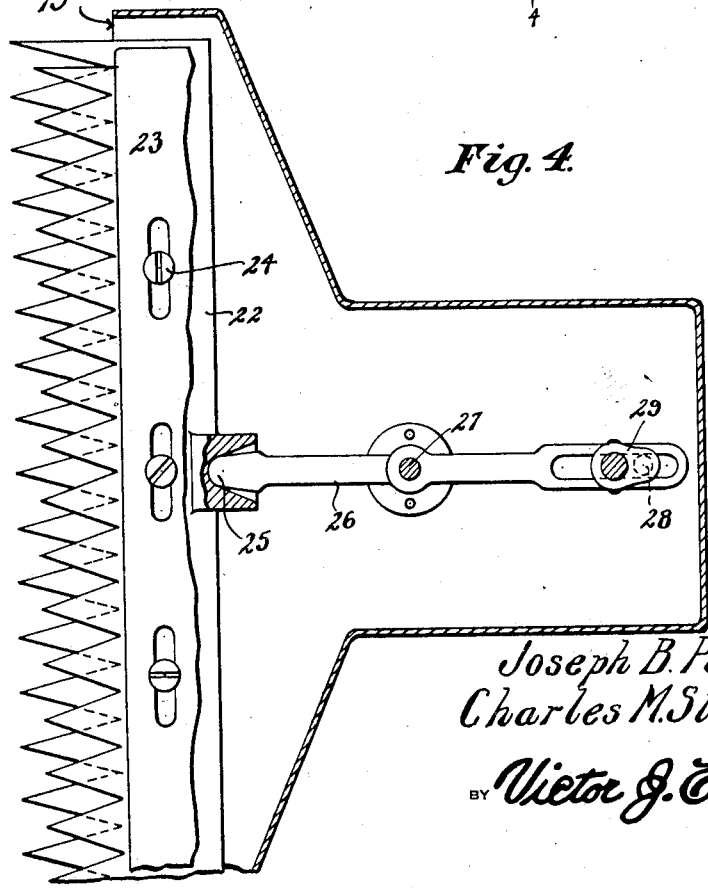
Figure 4 is an enlarged fragmentary section on the line 4—4 of Figure 3.

Referring to the drawings in detail wherein like characters of reference denote corresponding parts, the improved mower as shown comprises a housing which includes a substantially central fan chamber 10, upon the top of which is mounted a motor chamber 11, while extending from the opposite side or beneath the fan chamber is a suction chamber 12. This suction chamber is open at each end and its inner end communicates with the fan chamber 10 while its outer end is provided with a relatively narrow laterally flared mouth 13. The fan chamber 10 has extending therefrom a tubular discharge passage 14 which communicates with the interior of a bag or similar receptacle 15 which is designed to receive the cut grass, as will be hereinafter apparent.

The housing is mounted upon supporting wheels 16 which are secured to the said housing by bearing brackets 17. Mounted upon the axle of the wheels 16 is the bifurcated end 18 of a handle 19, the lower ends of the handle being secured to the housing as indicated at 20.

Secured along the mouth 13 of the suction chamber 12 by means of screws or bolts 21 is a stationary cutter bar 22 and mounted for sliding movement upon this bar is a movable cutter bar 23, the latter having a screw and slot connection 24 with the bar 22 so that it may be horizontally reciprocated.

For the purpose of operating the movable cutter bar 23, the latter has a pivotal connection 25 with one end of an oscillating lever 26, the said lever being pivotally mounted as shown at 27. The opposite end of this lever has a sliding pivotal connection as shown at 28 with one end of a crank arm 29, the latter being secured to the lower end of the shaft 30 of a motor 31 which is mounted within the motor chamber 11. The shaft 30 is supported by a bearing 32.

The shaft 30 extends through the fan chamber 10 and the suction chamber 12 and secured upon this shaft within the chamber 10 is a fan 33, so that the motor in addition to operating the cutter at the outer end of the suction chamber also operates the fan.

By this means grass or other vegetation which is cut by the cutter will be drawn into and through the suction chamber 12 by the action of the fan 33 and will be discharged outward through the discharge passage 14 into the bag 15.

The cutter bar 10 may be supported by suitable runners 34 as is usual in devices of this character.

The invention is susceptible of various changes in its form, proportions and minor details of construction and the right is herein reserved to make such changes as properly fall within the scope of the appended claims.

Having described the invention what is claimed is:—

1. A lawn mower comprising a housing including a motor chamber, a suction chamber and a fan chamber between the motor and suction chambers, the last mentioned chamber being open at both ends, a horizontal reciprocatory cutter at the outer open end of the suction chamber, a motor within the motor chamber and having its shaft extending through the fan chamber, a fan located within the fan chamber upon the motor shaft, a discharge passage for the fan chamber, a crank arm secured to the motor shaft and a pivotally mounted oscillating lever having one end operatively connected to the crank arm and its opposite end operatively connected to the reciprocatory cutter whereby the latter may be operated.

2. A lawn mower comprising a housing including an upper motor chamber, an intermediate fan chamber located beneath and arranged axially of the motor chamber and a lower suction chamber, said suction chamber being open at both ends and having one of its ends in communication with the fan chamber approximately central of the latter, a motor within the motor chamber and having its shaft extending downwardly through the fan and suction chambers, a fan upon the shaft within the fan chamber, an outlet for the fan chamber, a cutter arranged at the outer end of the suction chamber and means connecting the cutter and shaft to operate said cutter.

In testimony whereof we affix our signatures.

JOSEPH B. PEEBLES.
CHARLES M. STEWART.